(12) United States Patent
Hashiguchi et al.

(10) Patent No.: US 8,891,139 B2
(45) Date of Patent: Nov. 18, 2014

(54) IMAGE READING SYSTEM, IMAGE READING DEVICE AND IMAGE READING METHOD

(75) Inventors: Hiroyuki Hashiguchi, Kagoshima (JP); Takashi Hamasaki, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 850 days.

(21) Appl. No.: 12/907,869

(22) Filed: Oct. 19, 2010

(65) Prior Publication Data

US 2011/0090543 A1    Apr. 21, 2011

(30) Foreign Application Priority Data

Oct. 21, 2009   (JP) .................................. 2009-242226

(51) Int. Cl.
| | | |
|---|---|---|
| H04N 1/04 | (2006.01) | |
| H04N 1/32 | (2006.01) | |
| H04N 1/40 | (2006.01) | |
| G06F 3/12 | (2006.01) | |
| H04N 1/00 | (2006.01) | |

(52) U.S. Cl.
CPC ....... *H04N 1/00127* (2013.01); *H04N 1/00244* (2013.01); *H04N 1/00233* (2013.01); *H04N 2201/001* (2013.01); *H04N 1/00318* (2013.01); *H04N 1/0023* (2013.01); *H04N 1/00413* (2013.01); *H04N 1/00228* (2013.01); *H04N 2201/0093* (2013.01)
USPC ........... 358/474; 358/442; 358/468; 358/444; 358/1.15; 358/1.16

(58) Field of Classification Search
USPC ................ 358/442, 468, 474, 437, 486, 1.15, 358/1.16, 1.13, 404, 444
See application file for complete search history.

(56) References Cited

U.S. PATENT DOCUMENTS

| | | | |
|---|---|---|---|
| 2010/0014112 A1 | 1/2010 | Yoshida | |
| 2010/0315675 A1* | 12/2010 | Yagi | 358/1.15 |
| 2011/0110610 A1* | 5/2011 | Hashiguchi | 382/321 |
| 2011/0191613 A1* | 8/2011 | Dogo et al. | 713/320 |
| 2011/0242558 A1* | 10/2011 | Usui | 358/1.9 |
| 2011/0242586 A1* | 10/2011 | Usui | 358/1.15 |
| 2012/0026556 A1* | 2/2012 | Katahira | 358/442 |
| 2012/0127541 A1* | 5/2012 | Kishida | 358/474 |
| 2013/0258405 A1* | 10/2013 | Tsuya | 358/1.15 |

FOREIGN PATENT DOCUMENTS

| | | |
|---|---|---|
| JP | 07-271702 A | 10/1995 |
| JP | 11-127298 A | 5/1999 |
| JP | 2002-290638 A | 10/2002 |
| JP | 2004-215009 A | 7/2004 |
| JP | 2007-166516 A | 6/2007 |
| JP | 2007-336483 A | 12/2007 |

* cited by examiner

*Primary Examiner* — Cheukfan Lee
(74) *Attorney, Agent, or Firm* — Kilpatrick Townsend & Stockton LLP

(57) ABSTRACT

Disclosed is an image reading device that is connected to a network. The image reading device includes a pull scanning section that reads an original sheet on the basis of preset reading settings and transmits the image data of the read original sheet to a terminal device when the pull scanning section receives a read command from the terminal device; a storage section that stores the reading settings; and a push scanning section that reads the original sheet on the basis of reading settings selected from among the reading settings stored in the storage section and transmits the image data of the read original sheet to the terminal device when the terminal device is specified as a destination device and the push scanning section is instructed to read the original sheet.

4 Claims, 3 Drawing Sheets

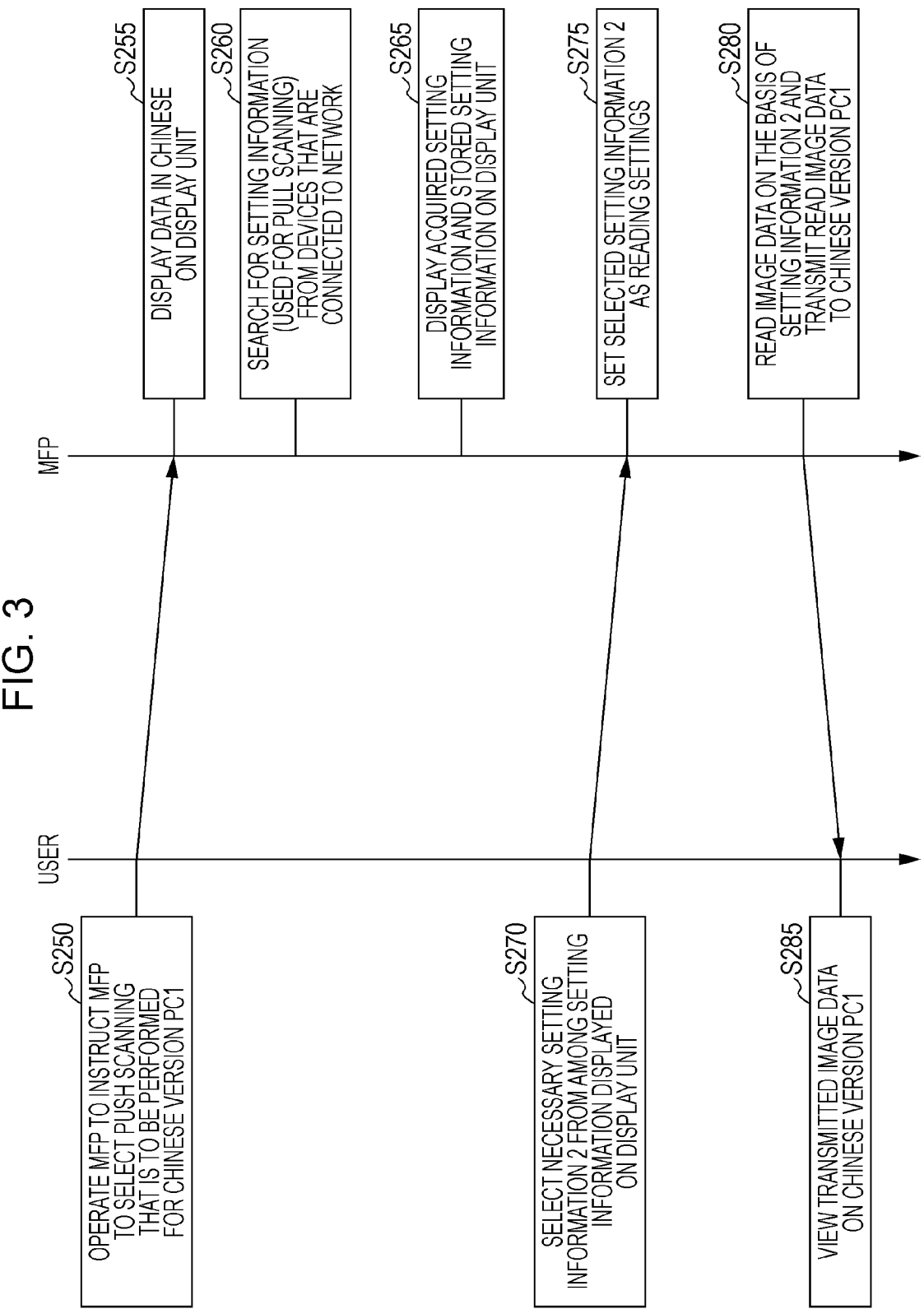

IMAGE READING SYSTEM, IMAGE READING DEVICE AND IMAGE READING METHOD

CROSS REFERENCES TO RELATED APPLICATIONS

The present invention claims priority to Japanese Patent Application No. 2009-242226 filed in the Japanese Patent Office on Oct. 21, 2009, the entire contents of which are incorporated herein by reference.

BACKGROUND

1. Technical Field

The present invention relates to an image reading system, an image reading device and an image reading method.

2. Related Art

In recent years, network scanners have been proposed, each of which has a function of reading an original sheet and is connected to multiple computers through a network and capable of transmitting image data of the original sheet read by the network scanner to the computers. Each of the network scanners is capable of transmitting the image data of the original sheet read by the network scanner to the computers through two methods, pull scanning and push scanning, as described in JP-A-11-127298.

Pull scanning is a process in which a user operates a terminal device in order to read an original sheet, the terminal device transmits a read command to an image reading device on the basis of the operation performed by the user, and the image reading device starts reading the original sheet on the basis of the read command and transmits image data of the read original sheet to the terminal device. Push scanning is a process in which a user operates an image reading device in order to read the original sheet, and the image reading device starts reading an original sheet on the basis of the operation performed by the user and transmits image data of the read original sheet to a terminal device that has been specified by the user.

However, when the network scanner performs push scanning, settings for reading the original sheet are limited to a method for compressing an image data file, resolution, an image file format and the like. Thus, settings for push scanning cannot be set in detail unlike for pull scanning.

SUMMARY

An advantage of some aspects of the invention is that settings for reading an original sheet and the like can be set for push scanning in detail. The invention has been devised to solve at least a part of the aforementioned problem and can be achieved by the following embodiment or aspects of the invention.

According to a first aspect of the invention, an image reading system includes: an image reading device that is connected to a network, reads an original sheet and transmits image data of the read original sheet; and a terminal device that is connected to the network and receives the image data of the original sheet from the image reading device, wherein the image reading device includes: a pull scanning section that reads the original sheet on the basis of preset reading settings and transmits the image data of the read original sheet to the terminal device when the image reading device receives a read command that has been transmitted by the terminal device according to an operation performed in the terminal device in order to read the original sheet; a storage section that stores the reading settings; and a push scanning section that reads the original sheet on the basis of reading settings selected from among the reading settings stored in the storage section and transmits the image data of the original sheet to the terminal device when the terminal device is specified as a destination device and the push scanning section is instructed to read the original sheet.

Since the image reading system has the aforementioned configuration, the reading settings that are referenced by the pull scanning section in order to read the original sheet are stored in the storage section, and the push scanning section reads the original sheet on the basis of the reading settings selected from among the reading settings stored in the storage section. The reading settings that are set for pull scanning can be stored and used for push scanning Thus, settings for reading the original sheet and the like can be set for push scanning in detail.

According to a second aspect of the invention, an image reading device that is connected to a network, reads an original sheet and transmits image data of the read original sheet to a terminal device that is connected to the network includes: a pull scanning section that reads the original sheet on the basis of preset reading settings and transmits the image data of the read original sheet to the terminal device when the pull scanning section receives a read command from the terminal device; a storage section that stores the reading settings; and a push scanning section that reads the original sheet on the basis of reading settings selected from among the reading settings stored in the storage section and transmits the image of the read original sheet to the terminal device when the terminal device is specified as a destination device and the push scanning section is instructed to read the original sheet.

Since the image reading device has the aforementioned configuration, the reading settings that are referenced by the pull scanning section in order to read the original sheet are stored in the storage section, and the push scanning section reads the original sheet on the basis of the reading settings selected from among the reading settings stored in the storage section. The reading settings that are set for pull scanning can be stored and used for push scanning Thus, settings for reading the original sheet and the like can be set for push scanning in detail.

It is preferable that the image reading device according to the second aspect of the invention further include a display section that displays the reading settings, wherein the push scanning section acquires information on a language that is set in the terminal device to which the image data of the read original sheet is transmitted, and the display section displays, in the language, the reading settings stored in the storage section.

Since the image reading device has the aforementioned configuration, the reading settings can be displayed on the display section in the same language as the language set in the terminal device to which the image data of the read original sheet is transmitted.

In the image reading device according to the second aspect of the invention, it is preferable that the push scanning section acquire the reading settings from the terminal device connected to the network, adds the acquired reading settings to the reading settings stored in the storage section and reads the original sheet on the basis of the reading settings selected from among the reading settings acquired from the terminal device.

Since the image reading device has the aforementioned configuration, the settings for reading the original sheet and the like can be acquired from the terminal device (connected to the network) in order to perform push scanning.

In the image reading device according to the second aspect of the invention, it is preferable that the storage section associates the reading settings with date information and user information and stores the reading settings associated with the date information and the user information.

Since the image reading device has the aforementioned configuration, the reading settings can be managed while being associated with the date information and the user information.

According to a third aspect of the invention, an image reading method, in which an original sheet is read and image data of the read original sheet is transmitted to a terminal device that is connected to a network, includes: performing pull scanning to read the original sheet on the basis of preset reading settings and transmit the image data of the read original sheet to the terminal device when a read command that is transmitted by the terminal device according to an operation performed in the terminal device in order to read the original sheet is received; storing the reading settings; and performing push scanning to read the original sheet on the basis of reading settings selected from among the stored reading settings and transmit image data of the read original sheet to the terminal device when an operation for reading the original sheet is requested.

Since the image reading method is performed in the aforementioned manner, the reading settings that are referenced by the pull scanning section in order to read the original sheet are stored in the storage section, and the push scanning section reads the original sheet on the basis of the reading settings selected from among the reading settings stored in the storage section. The reading settings that are set for pull scanning can be stored and used for push scanning. Thus, settings for reading the original sheet and the like can be set for push scanning in detail.

BRIEF DESCRIPTION OF THE DRAWINGS

The invention will be described with reference to the accompanying drawings, wherein like numbers reference like elements.

FIG. 3 is a flowchart of another one of the processes that can be performed by the MFP.

DESCRIPTION OF EXEMPLARY EMBODIMENTS

An image reading system is described below with reference to the accompanying drawings.

Embodiment

Figure 1:
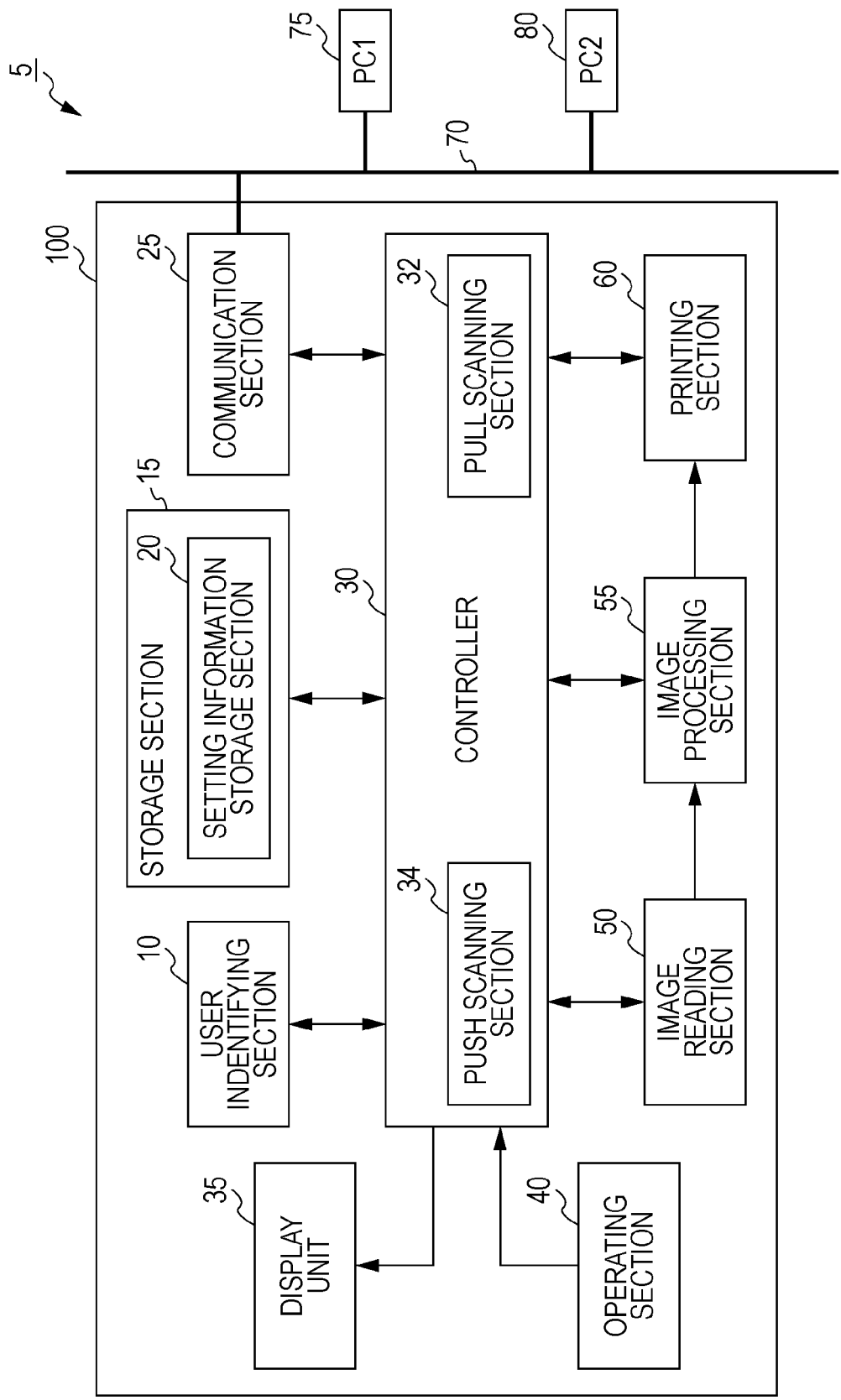
FIG. 1 is a diagram showing an example of the entire configuration of an image reading system according to an embodiment of the invention.

FIG. 1 is a diagram showing the entire configuration of an image reading system 5 according to the embodiment of the invention. The image reading system 5 includes a multifunction peripheral (MFP) 100 and computers (PC1 and PC2) 75 and 80. The MFP 100 serves as an image reading device and has a function of reading an original sheet, a function of outputting image data of the read original sheet, and a function of printing the image data. Each of the PC1 75 and the PC2 80 communicates with the MFP 100 to instruct the MFP 100 to read an image, receives the image data read by the MFP 100 and stores the received image data. The MFP 100, the PC1 75 and the PC2 80 are connected to each other through a network 70 such as a local area network (LAN) so that the MFP 100, the PC1 75 and the PC2 80 can communicate with each other. Various network devices ((not shown) such as a fax machine that operates while being connected to the network) may be connected to the network 70.

Each of the PC1 75 and the PC2 80 has therein a storage section (not shown) that stores various data. Each of the storage sections includes a hard disk or the like. The storage sections mainly store the image data read by the MFP 100. The PC1 75 and the PC2 80 serve as data storage that stores the image data read by the MFP 100.

The MFP 100 reads, by performing a scanning operation, graphics, photos or characters from an original sheet and converts the read data into digital data (image data) while the original sheet is placed on platen glass (not shown) or transported over the platen glass. The MFP 100 includes a user identifying section 10, a storage section 15, a communication section 25, a controller 30, a display section 35, an operating section 40, an image reading section 50, an image processing section 55 and a printing section 60. The controller 30 controls each of the functional sections included in the MFP 100. The controller 30 includes a random access memory (RAM), a read-only memory (ROM) and a central processing unit (CPU) as hardware, which are not shown. The controller 30 controls each functional section by causing the hardware to operate with various types of software.

In addition, the controller 30 includes a pull scanning section 32 and a push scanning section 34. The pull scanning section 32 has a function of performing pull scanning. Specifically, when a user operates the PC1 75 (or the PC2 80) in order to read the original sheet, and the PC1 75 (or the PC2 80) transmits a read command on the basis of the operation performed by the user, and the image reading section 50 receives the read command, the image reading section 50 starts reading the original sheet on the basis of preset reading settings and transmits image data of the read original sheet to the PC1 75 (or the PC2 80).

The push scanning section 34 has a function of performing push scanning Specifically, when the user operates the MFP 100 in order to read the original sheet, the image reading section 50 starts reading the original sheet on the basis of reading settings that are used for pull scanning and are stored in the storage section 15 and transmits image data of the read original sheet to the PC1 75 (or the PC2 80) that has been specified by the user. The user can specify a destination device of the image data by operating the operating section 40 on the basis of information displayed on the display section 35. The push scanning section 34 also includes a function of acquiring information on a language set in the PC1 75 (or PC2 80) that has been specified as the destination device, a function of converting read information and the like into data that can be displayed in the acquired language, and a function of displaying the converted data on the display section 35.

The user indentifying section 10 identifies computer names of the PC1 75 and PC2 80 and users who use the computers. In the present embodiment, information on the users who use the MFP 100 is preregistered in the MFP 100. The MFP 100 is set so that a user is authenticated using a login name and a password before the user uses the MFP 100. When pull scanning is performed in the MFP 100, the MFP 100 generates user information that includes date information and a computer name. The generated user information and reading settings for pull scanning are associated with each other to form setting information. The setting information is stored in a setting information storage section 20 that is included in the storage section 15. Various types of information may be stored in the setting information storage section 20 on the basis of the frequency of use of the information. In addition, the various types of information may be stored in the setting information storage section 20 for a certain period of time. Furthermore, the various types of information may be stored in the setting information storage section 20 as long as the amount of the information does not exceed a certain amount. The setting information is not limited to information stored in the setting information storage section 20. The user may perform a predetermined operation so that the MFP 100 searches for the setting information (used for pull scanning) from devices that are connected to the network 70, acquires the setting information and uses the setting information for push scanning.

The image reading section 50 includes an illuminating lamp, an optical system, and a charge coupled device (which are not shown). The reading method that is used by the image reading section 50 is not limited. The image reading section 50 may use a flat bed method to scan the original sheet while the original sheet is fixed. In addition, the image reading section 50 may use an automatic document feeding method to scan the original sheet while the original sheet is transported. The controller 30 transmits a scan command to the image reading section 50. The image reading section 50 performs a scanning process on the original sheet (placed at a predetermined position) on the basis of the scan command to read image data of the original sheet for each line. The image reading section 50 transmits the read image data to the image processing section 55.

The image processing section 55 converts the image data read by the image reading section 50 into a predetermined format (color-converted data) such as CMYK data, for example. The converted data is stored in the storage section 15 on the basis of an instruction that has been transmitted from the operating section 40 or the PC1 75 (or the PC2 80). In addition, the converted data is transmitted to the PC1 75 (or the PC2 80) on the basis of an instruction that has been transmitted from the operating section 40 or the PC1 75 (or the PC2 80). Furthermore, a printer control command may be added to the converted CMYK data on the basis of an instruction so that the converted CMYK data is transmitted to the printing section 60 and printed by the printing section 60. The printing method of the printing section 60 is not limited and may be a laser printing method or an ink jet printing method.

Figure 2:
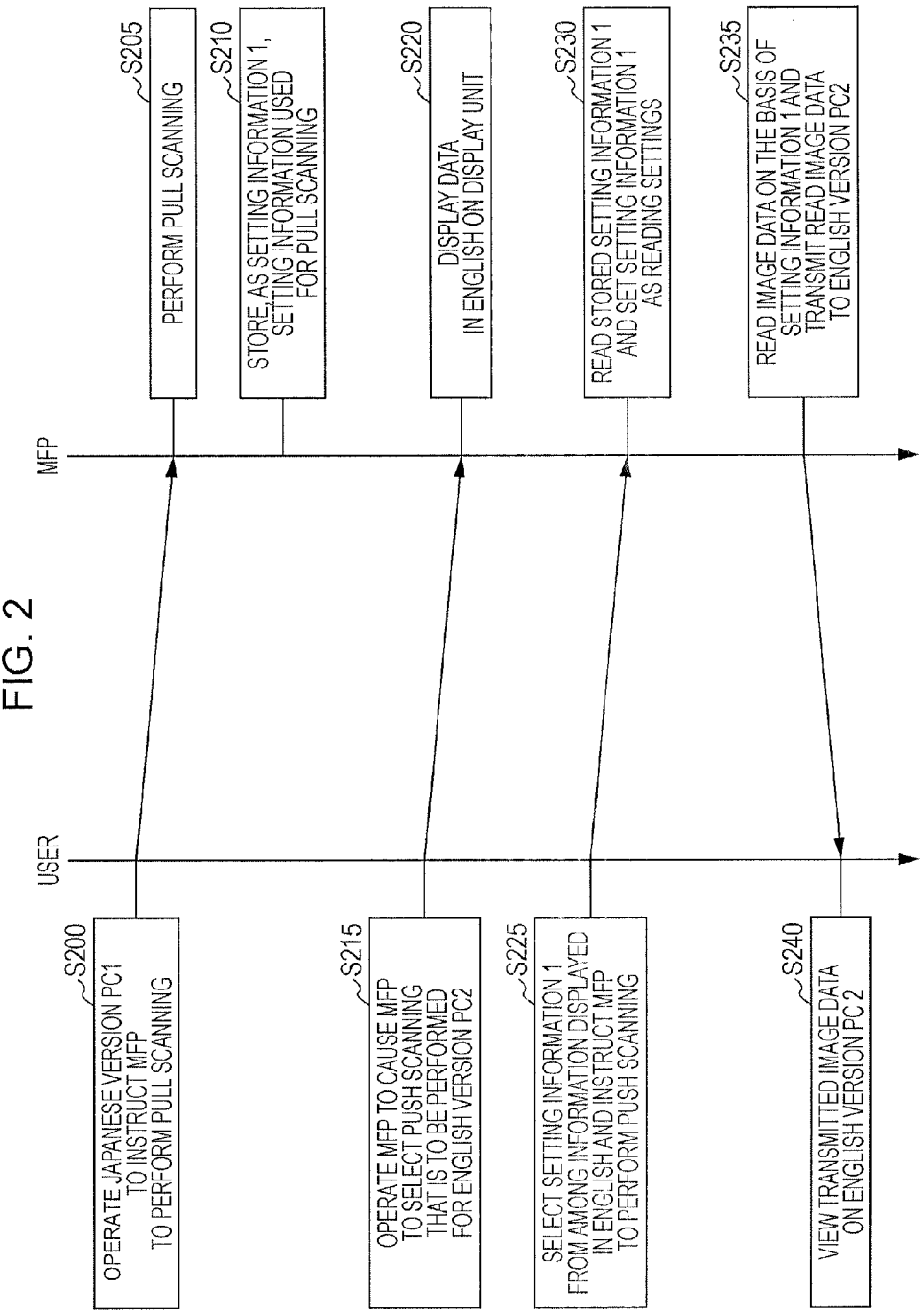
FIG. 2 is a flowchart of one of processes that can be performed by an MFP.

FIG. 2 is a flowchart of one of processes that can be performed by the MFP 100. In the process shown in FIG. 2, it is assumed that the PC1 75 is a Japanese version computer in which the language that is used to display data is set to Japanese. Japanese version management software such as a Japanese version driver and Japanese version application software is installed in the PC1 75. In addition, in the process shown in FIG. 2, it is assumed that the PC2 80 is an English version computer in which the language that is used to display data is set to English. English version management software such as an English version driver and English version application software is installed in the PC2 80.

First, the user operates the Japanese version PC1 75 to instruct the MFP 100 to perform pull scanning (in step S200). In response to the instruction, the MFP 100 performs pull scanning (in step S205). Then, the MFP 100 associates setting information (that includes reading settings used for pull scanning) with user information to form setting information 1 and stores the setting information 1 (in step S210).

Next, the user operates the MFP 100 to cause the MFP 100 to select push scanning that is to be performed for the English version PC2 80 (in step S215). In response to the selection, the MFP 100 acquires data that indicates that the PC2 80 is an English version computer. The MFP 100 then converts the setting information stored in the setting information storage section 20 into data that can be displayed in English. The MFP 100 then displays the converted data on the display section 35 (in step S220).

Then, the user operates the MFP 100 to cause the MFP 100 to select the setting information 1 from among the information displayed by the MFP 100 and instructs the MFP 100 to perform push scanning (in step S225). In response to the instruction, the MFP 100 reads the setting information 1 selected by the user from among the setting information that has been stored in the setting information storage section 20 and associated with the user information and sets reading settings included in the read setting information 1 as reading settings that are to be used by the MFP 100 (in step S230).

Then, the MFP 100 reads image data on the basis of the reading settings included in the setting information 1 and transmits the read image data to the English version PC2 80 (in step S235).

Next, the user activates application software or the like on the PC2 80 to cause the PC2 80 to display the image data transmitted from the MFP 100 so that the user views the image data (in step S240).

In the process shown in FIG. 2, the reading settings for pull scanning can be read out in order to perform push scanning and can be set as the reading settings for push scanning. In addition, the MFP 100 acquires the information that indicates that the language set in the PC2 80 (that has been specified as the destination device) is English. The MFP 100 displays the information in English on the display section 35. Thus, the image reading system 5 can provide a user-friendly environment.

FIG. 3 is a flowchart of another one of the processes that can be performed by the MFP 100. In the process shown in FIG. 3, it is assumed that the PC1 75 is a Chinese version computer in which the language that is used to display data is set to Chinese. Chinese version management software such as a Chinese version driver and Chinese version application software is installed in the PC1 75. In this case, when the user changes settings for pull scanning, the changed setting information can be identified and stored by using the management software.

First, the user operates the MFP 100 to instruct the MFP 100 to select push scanning that is to be performed for the Chinese version PC1 75 (in step S250). In response to the selection, the MFP 100 acquires data that indicates that the PC1 75 is a Chinese version computer. Then, the MFP 100 converts the setting information stored in the setting information storage section 20 into data that can be displayed in Chinese. The MFP 100 then displays the converted data on the display section 35 (in step S255).

Next, the MFP 100 searches for setting information (used for pull scanning) from devices that are connected to the network 70 (in step S260). In response to the search, a computer that uses management software to store the setting information transmits a notification to the MFP 100.

The MFP 100 receives the notification and acquires the setting information from the computer. Then, the MFP 100 displays, on the display section 35, the setting information acquired from the computer and the setting information stored in the MFP 100 (in step S265).

Then, the user selects necessary setting information as setting information 2 from among the setting information displayed on the displayed unit 35 (in step S270).

In response to the selection, the MFP 100 sets reading settings included in the selected setting information 2 as reading settings that are to be used by the MFP 100 (in step S275). Subsequently, the MFP 100 reads image data on the basis of the reading settings included in the setting information 2 and transmits the read image data to the Chinese version PC1 75 (in step S280).

Then, the user activates application software or the like on the PC1 75 to cause the PC1 75 to display the image data transmitted from the MFP 100 so that the user views the image data (in step S285).

In the process shown in FIG. 3, the MFP 100 can acquire the setting information set for pull scanning from the device connected to the network and can perform push scanning on the basis of the acquired setting information.

The embodiment of the invention is described above with reference to the accompanying drawings. However, the configuration of the system is not limited to the embodiment and may be modified without departing from the gist of the invention. The MFP 100 is used as the image reading device in the embodiment. However, the image reading device is not limited to the MFP 100. The image reading device may be any device as long as the device has a network scanning function.

A single image reading device that performs the aforementioned operations is used in the image reading system in some cases. In addition, a plurality of image reading devices that perform the aforementioned operations are used in the image reading system in some cases.

What is claimed is:

1. An image reading device that is connected to a network, reads an original sheet and transmits image data of the read original sheet to a terminal device that is connected to the network, comprising:
    a pull scanning section that reads the original sheet on the basis of preset reading settings and transmits the image data of the read original sheet to the terminal device when the pull scanning section receives a read command from the terminal device;
    a storage section that stores the reading settings;
    a push scanning section that reads the original sheet on the basis of reading settings selected from among the reading settings stored in the storage section and transmits the image data of the read original sheet to the terminal device when the terminal device is specified as a destination device and the push scanning section is instructed to read the original sheet; and
    a display section that displays the reading settings,
    wherein the push scanning section acquires information on a language that is set in the terminal device to which the image data of the read original sheet is transmitted, and the display section displays, in the language, the reading settings stored in the storage section.

2. The image reading device according to claim 1, wherein the push scanning section acquires the reading settings from the terminal device connected to the network, adds the acquired reading settings to the reading settings stored in the storage section and reads the original sheet on the basis of the reading settings selected from among the reading settings acquired from the terminal device.

3. The image reading device according to claim 1, wherein the storage section associates the reading settings with date information and user information and stores the reading settings associated with the date information and the user information.

4. An image reading method, in which an original sheet is read and image data of the read original sheet is transmitted to a terminal device that is connected to a network, comprising:
    performing pull scanning to read the original sheet on the basis of preset reading settings and transmit the image data of the read original sheet to the terminal device when a read command that is transmitted by the terminal device according to an operation performed in the terminal device in order to read the original sheet is received;
    storing the reading settings; and
    performing push scanning to read the original sheet on the basis of reading settings selected from among the stored reading settings and transmit image data of the read original sheet to the terminal device when an operation for reading the original sheet is requested,
    wherein in push scanning, information on a language set in the terminal device to which the image data of the read original sheet is transmitted is acquired, and the reading settings stored in the storage section are displayed in the language on a display section.

* * * * *